United States Patent [19]

Robinson

[11] Patent Number: 4,637,349
[45] Date of Patent: Jan. 20, 1987

[54] BOILER CYCLING CONTROLLER

[75] Inventor: Anthony Robinson, London, England

[73] Assignee: E.S.G. Controls, Ltd., Cambridge, England

[21] Appl. No.: 628,992

[22] Filed: Jul. 9, 1984

[30] Foreign Application Priority Data

Jul. 7, 1983 [GB] United Kingdom ............... 8318452

[51] Int. Cl.⁴ ............................................. F22B 35/00
[52] U.S. Cl. ................................ 122/448 B; 236/32; 236/91 E; 236/91 F; 237/8 R
[58] Field of Search ............. 122/446, 448 R, 448 B; 236/91 R, 91 B, 91 E, 91 F, 32; 165/28; 237/8 R

[56] References Cited

U.S. PATENT DOCUMENTS

| | | | |
|---|---|---|---|
| 2,181,480 | 11/1939 | Gillett et al. | 237/8 R |
| 2,504,491 | 4/1950 | Broderick | 237/8 R |
| 2,626,755 | 1/1953 | Tidd | 237/8 R |
| 3,408,004 | 10/1968 | Miller | 236/91 E |
| 3,576,177 | 4/1971 | Block et al. | 122/448 B |
| 3,979,710 | 9/1976 | Jespessen | 236/91 F |
| 3,995,810 | 12/1976 | Banks | 237/8 R |
| 4,003,342 | 1/1977 | Hodgson | 122/448 R |
| 4,108,375 | 8/1978 | Keeney | 236/91 F |
| 4,290,551 | 9/1981 | Johnstone | 237/8 R |

Primary Examiner—Albert J. Makay
Assistant Examiner—Steven E. Warner
Attorney, Agent, or Firm—Banner, Birch, McKie & Beckett

[57] ABSTRACT

In a system for controlling a number of central heating boilers of large capacity having means for switching-off each boiler when the flow temperature reaches a predetermined maximum, the temperature at which each boiler is switched on again can be automatically varied in dependence upon the outside temperature in such a manner that as the outside temperature rises the boiler is switched on at progressively lower boiler flow temperatures, thus increasing the length of the boiler cycles. This is achieved by a boiler cycling controller which receives signals from temperature detecting devices located externally of the building and in the water flow and return lines and is operable automatically to vary the point at which the boiler is switched on.

7 Claims, 4 Drawing Figures

BOILER CYCLING CONTROLLER

This invention relates to the control of boilers of the kind principally used for the heating of buildings and is particularly concerned with the control of oil and gas fired boilers employed in the heating systems of commercial and industrial premises.

Such boilers only achieve their rated combustion efficiency when running continuously at full load and in practice, boilers with substantial space-heating loads usually operate at a load factor of 50% or less and this problem is increased as energy saving measures are taken and average load factor falls still further, as can be seen from the graph shown in FIG. 1 of the accompanying drawings.

Heating boilers are normally fitted with thermostats which are designed to switch on the burner when the temperature of the water flowing out of the boiler falls to a predetermined value and to switch the burner off again when the temperature reaches a predetermined higher value. In practice, the temperatures at which the boiler is switched on and off are set at only a few degrees centigrade apart and any widening of the gap has the effect of lowering the average flow temperature of the water and consequently the output of the boiler. At the same time, however, the narrowness of this gap increases the likelihood of a boiler operating on low load being switched on and off at frequent intervals, a process, generally known as "cycling" which further reduces the efficiency of the boiler. When operating at a load factor of around 50% each firing cycle lasts about 6 minutes followed by an "off" period of about the same length so that each complete cycle lasts about 12 minutes and is repeated five times in every hour. Since operational efficiency is reduced at the beginning and end of each firing cycle it follows that with cycles of such short duration the boiler will be operating at less than maximum efficiency for a substantial proportion of the total operating time. This results in rapidly decreasing efficiency as the load factor falls, as can be seen from FIG. 1 on the drawings.

The importance of load factor in relationship to boiler efficiency has been recognized for many years and various proposals for reducing efficiency losses include boiler sequencing, reducing thermal mass of boilers and reducing operating temperatures. Boiler sequencing involves the use of a plurality of boilers, the combined output of which is sufficient to meet maximum demand. As the load decreases, one or more of the boilers are taken out of service until the number left operating is the minimum required to meet th reduced load. Dependin upon the number of boilers employed, increased installation and maintenance costs have to be set off against any increase in efficiency.

Thermal mass can be reduced by cutting down the quantity of metal used in the construction of a boiler and the amount of water the boiler contains, and these in turn lead to more efficient operation at the beginning and end of each firing cycle. However, boilers of reduced thermal mass tend to be more expensive and less durable than boilers of traditional design.

Reducing the operating temperature as the outside temperature rises increases combustion efficiency, reduces boiler output for a given load and reduces heat losses through the boiler walls.

The present invention is concerned with increasing boiler efficiency by reducing the tendency to cycle when operating on low load and is based on the realization that as the outside temperature rises the boiler flow temperature can be reduced while still meeting demand. This in turn, makes it possible to considerably increase the difference between the temperatures at which the boiler switches on and off and this reduces the number of firing cycles by a factor of three or four.

According to the invention, therefore, a system for controlling the operation of a boiler of the kind referred to comprises at least two temperature detecting devices positioned to sense the temperature of the air outside the building to be heated and the boiler flow temperature respectively and to transmit signals corresponding to these temperatures to a boiler cycling controller which is operable automatically in response to said signals, to vary the point at which the boiler is switched on in accordance with variations in the outside temperature, in such a manner that as the outside temperature rises the boiler is switched on at progressively lower boiler flow temperatures while the switchoff temperature remains the same, thus increasing the length of boiler cycles. The system is preferably designed to provide a difference of 23° C. between switch-on and switch-off when the outside temperature reaches 12° C., as illustrated in FIG. 2 of the accompanying drawings, although this temperature is variable depending on the design of the system.

As the boiler flow temperature falls so the output of the boiler falls. However, in the same way the heating load on the boiler falls as outside temperature rises. The invention uses the fact that flow temperature can be lowered as outside temperature rises, to increase the differential between the temperature at which the boiler is switched off and on. In so doing it takes advantage of the considerable thermal energy stored in the circulating water, boiler and pipework to delay the reswitching on of the boiler for considerable periods in conditions of higher outside temperature. In these conditions the number of firing cycles is reduced from about four per hour to about one per hour.

In this way, the maximum output of the boiler is still maintained at low outside temperatures while at higher outside temperatures the efficiency of the boiler rises because the losses through the flue, boiler casing and transmission system are reduced and the burner is able to reach and remain for longer periods at its full operating efficiency.

Figure 1:
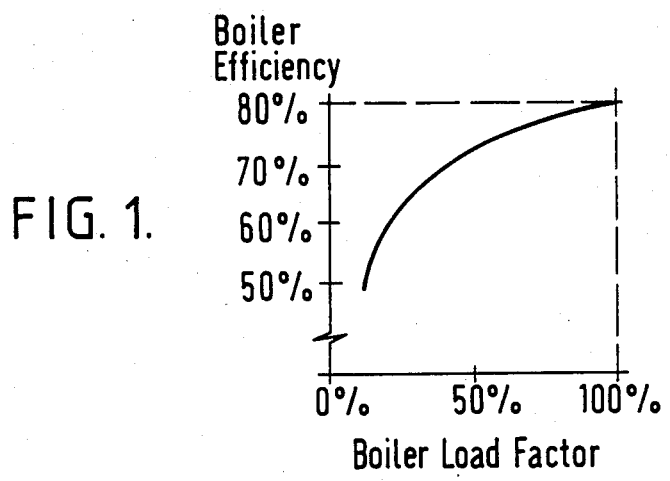
FIG. 1 is a graph illustrating the relation between load factor and efficiency in a typical boiler.
Figure 2:
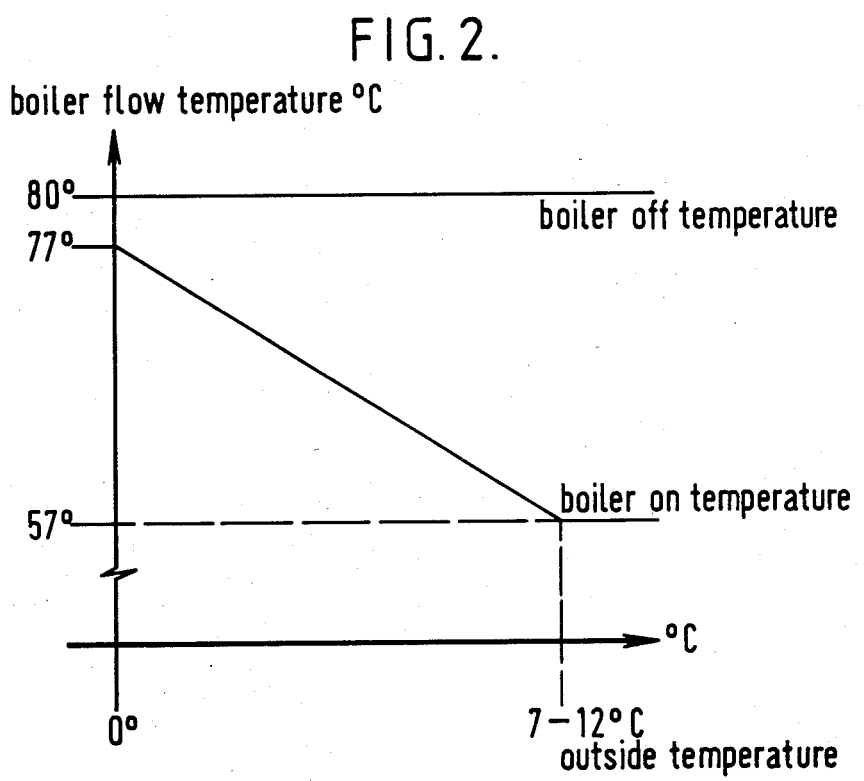
FIG. 2 is another graph illustrating the relation between boiler flow temperature and outside temperature when using a control system in accordance with the invention.
Figure 3:
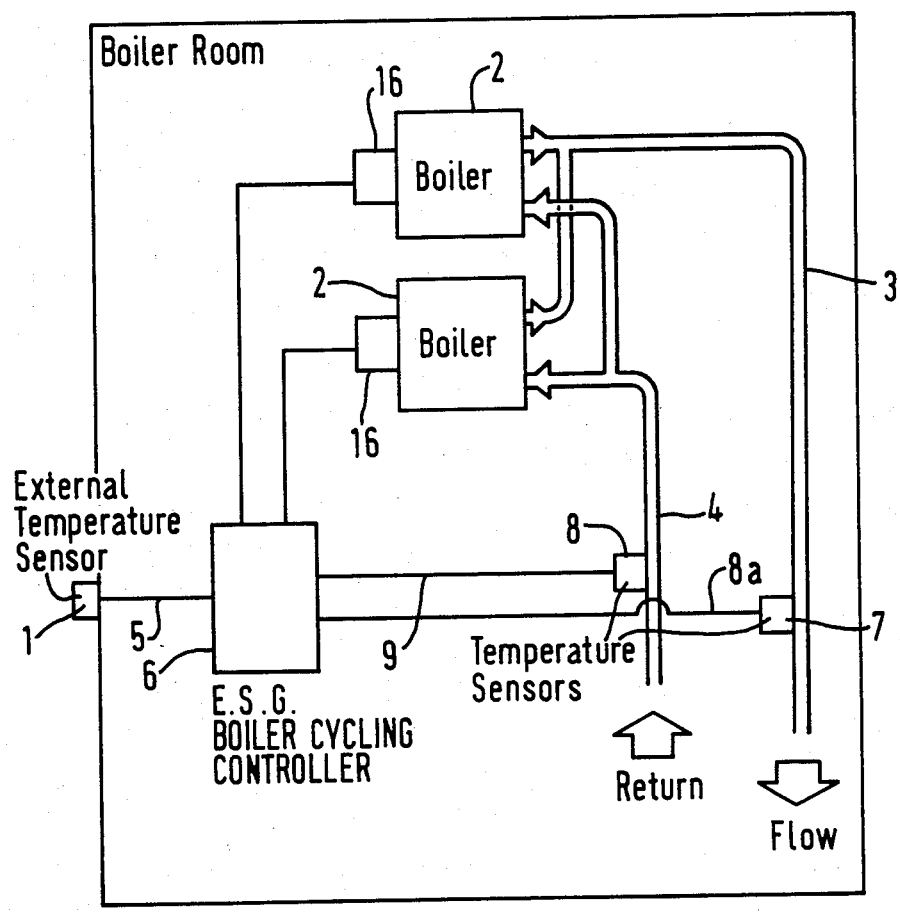
FIG. 3 is a schematic representation of a system according to the invention for controlling two boilers.
Figure 4:
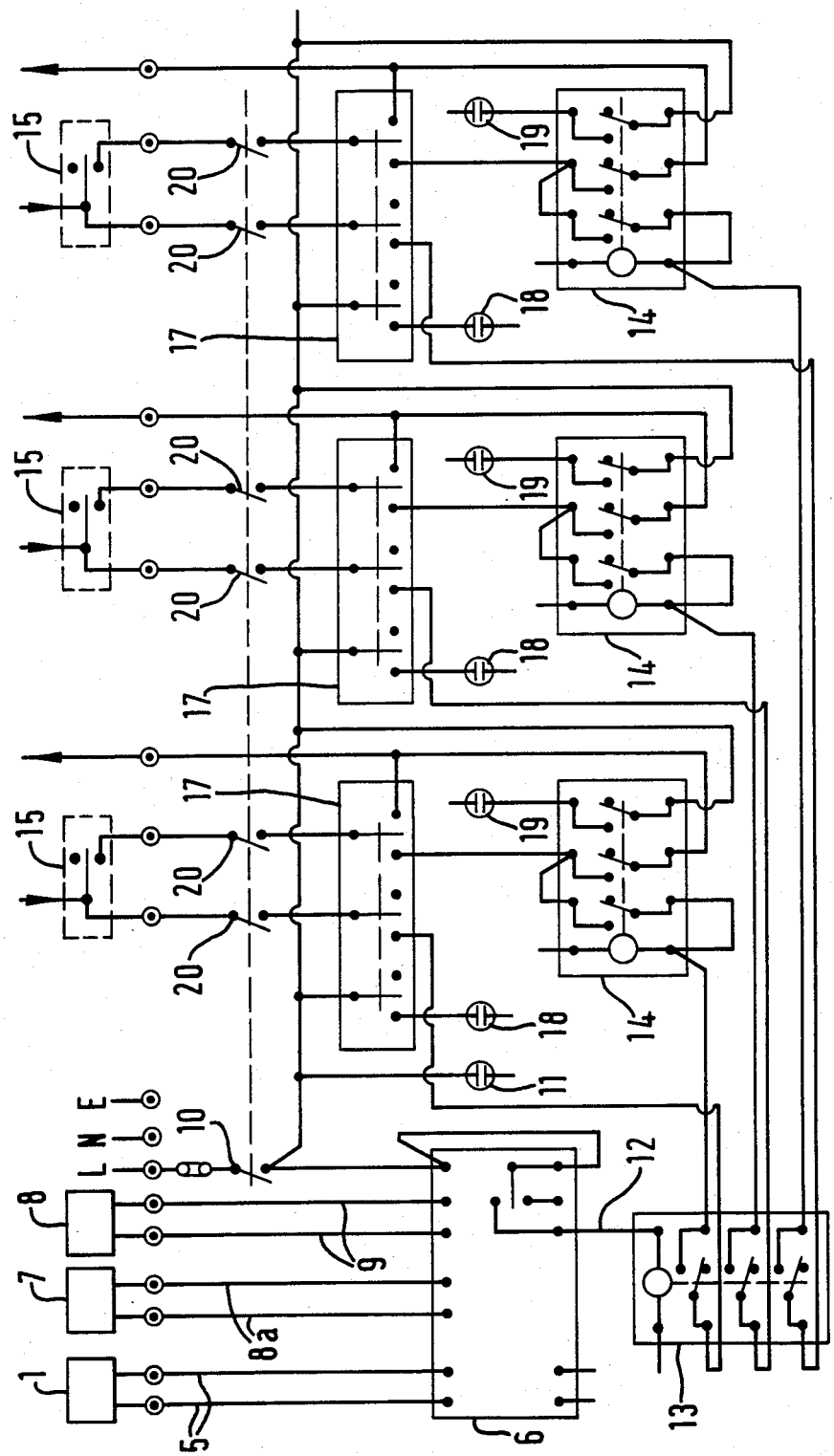
FIG. 4 is a circuit diagram of a system similar to that shown in FIG. 3, for controlling three boilers.

Referring to FIGS. 3 and 4 of the drawings, a temperature sensor 1 is mounted outside a building to be heated by a system comprising two or three boilers 2 connected by flow and return pipes 3 and 4 to a series of radiators (not shown). The sensor 1 is electrically connected by lines 5 to the input of a power-operated boiler cycling controller 6 which is mounted in a control panel (not shown) located inside the building. Temperature sensors 7 and 8 are located in the flow and return pipes 3 and 4 respectively and electrically connected to the input of the controller 6 by lines 8a and 9 respectively. The control panel is provided with an isolating door switch 10 and a neon lamp 11 for indicating when the power is on. The controller 6 which is shown in block form only, essentially comprises a main transformer and four modules (not shown) of conventional form, all marketed by Honeywell and comprising a compensator (Honeywell No. R7420D 1008) having its input connected to the sensors 1 and 7, a low temperature override (Honeywell No. Q642F 1004) having its input connected to the sensor 8, a second boiler control (Honeywell No. Q642F 1003) connected between the compensator and the low temperature override and a compensator switch (Honeywell No. Q642E 1004) having its input connected to the output of the other modules and its output applied through a line 12 to a relay 13, energization of which serves to simultaneously energize three identical relays 14 mounted, like the relay 13, inside the control panel and each connected between the thermostat 15 and burner 16 of its associated one of the boilers 2. Each relay 14 is thus operative, upon movement of an associated selector switch 17, into a left-hand or "AUTO" position to initiate switching on of the burner when the flow temperature has fallen to a minimum value determined by the controller 6 in accordance with the temperature detected by the outside sensor 1. For example, as shown in FIG. 2, at an outside temperature of 12° C., the burner of one or more of the boilers 2, dependent on load, may be switched on by the controller 6 at a flow temperature of 57° C. and switched off again by its thermostat 15 at a flow temperature of 80° C.

The selector switches 17, the neon lamp 11 and neon lamps 18 and 19 for indicating "Control On" and "Boiler On" in respect to each boiler 2 are all mounted on the front of the control panel. The selector switches 17 each have a "Manual" and an "Off" position in addition to the "Auto" position. In the manual position the associated boiler 2 is under the sole control of its thermostat 15.

In operation, closure of the panel door operates the switch 10 and simultaneously closes switches 20 operatively connected thereto and interposed in the lines between the switches 17 and associated thermostats 15. When one or more of the selector switches 17 is moved into its "Auto" position the flow temperature at which the associated boiler is switched on is determined by the controller 6 in accordance with the temperature detected by the outside sensor 1.

The sensor 8 located in the return pipe 4 is operable to override the control system and switch-on the boilers to ensure that the temperature at which return water enters the boilers does not drop below a predetermined value which is usually the setting recommended by the manufacturer of the boilers.

The system of the invention operates through the existing burner controls which continue to switch off the boilers when the flow temperature reaches a predetermined maximum and to function in the normal way at low outside temperatures.

I claim:

1. A system for controlling the operation of a heating boiler, comprising a thermostatic device continuously operable to switch off the boiler when the flow temperature of the boiler water reaches a predetermined maximum and selectively operable to switch on the boiler when the flow temperature falls to a fixed minimum, a boiler cycling controller connected at its input to devices for sensing the outside temperature and the boiler water temperature and selectively operable in response to the electrical signals received from said temperature sensing devices to switch on the boiler at temperatures which become progressively lower as the outside temperature rises, and a multi-position selector switch interposed between said thermostatic device and said boiler cycling controller on the one hand and the burner controls the boiler on the other hand, the arrangement being such that switching on of the boiler is controlled, in one position of the switch by said thermostatic device and in another position of the switch, by said boiler cycling controller.

2. A control system according to claim 1, including a further temperature-sensitive device for sensing the temperature of water returning to the boiler and transmitting electrical signals corresponding thereto to said controller, said controller being operable in response to said water returning temperature signals to ensure that the temperature at which return water enters the boiler does not drop below a predetermined minimum value.

3. A control system according to claim 1 or 2, wherein the output of said controller is supplied to the burner controls of the boiler through a relay and said multiposition selector switch which is interposed between said relay and an external power source.

4. A control system according to claim 3, for a plurality of boilers, wherein the relays for the individual boilers are connected to said controller through a common control relay and to the individual burner controls through separate selector switches.

5. A control system according to claim 4, wherein said controller, said relays and said selector switches are housed in a single control panel.

6. A control system according to claim 5, wherein each boiler is provided with its own thermostatic device continuously operable to switch off the burner when the flow temperature reaches a predetermined maximum and operable when the associated selector switch is in its "MANUAL" position to switch-on the boiler when the flow temperature falls to a fixed minimum.

7. A control system according to claim 6, wherein the switch-on function of each individual heat-sensitive device is transferred to said controller when the associated selector switch is in its "AUTO" position.

* * * * *